Patented Feb. 17, 1953

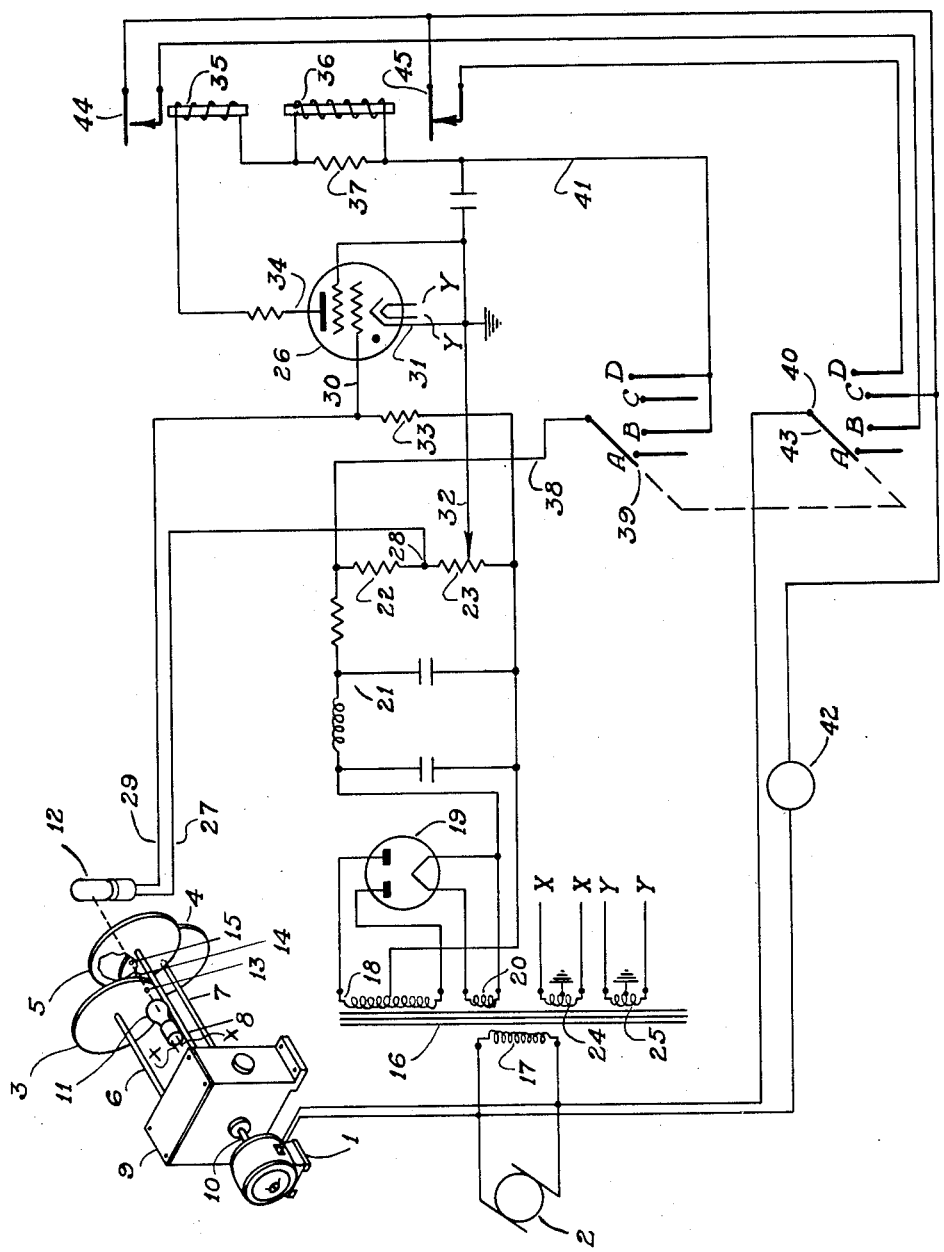

2,629,009

UNITED STATES PATENT OFFICE 2,629,009

APPARATUS FOR TESTING ELECTRIC TIMERS

William J. Kassimir, Philadelphia, Pa., assignor to The Atlantic Refining Company, Philadelphia, Pa., a corporation of Pennsylvania Application October 14, 1948, Serial No. 54,510

6 Claims. (Cl. 175—381)

This invention relates to a system for testing the accuracy of timing instruments. More particularly, the invention relates to a system for testing electric timers operative by the flow of electrical current therethrough.

The present system is adapted to check synchronously driven timers, that is, timers of the type driven by a synchronous motor, the rotor of which revolves an amount directly proportional to the number of cycles of alternating current which has passed through the motor, as is true of all conventional synchronous motors. As is well known to those skilled in the art, such timers customarily have as an element thereof an indicator or integrating mechanism which mechanically counts the revolutions of the motor rotor and provides a visual indication of the number of such revolutions. Such indicators or integrating mechanisms are conventionally calibrated to read in convenient time units, such as minutes or seconds. As one example, the indicator may take the form of a fixed dial secured to the body of the timer, and a pointer, or hand, mechanically connected with the motor rotor and adapted to move around the dial through a predetermined angle for each revolution of the motor rotor. The timer checker of the present invention functions to test the accuracy of any synchronously driven timer irrespective of the type of indicating mechanism forming a part thereof. Therefore, it is to be understood that the above description of timers and their indicating mechanisms is intended to be illustrative only, since the structure of such timers and indicators, per se, forms no part of the present invention.

The determination of the viscosity of a fluid by conventional methods generally involves the measurement of elapsed time intervals. For this purpose there are frequently employed electric timers, the operation of such a timer being induced by the application thereto of an alternating current potential and being interrupted by the removal of the potential. Similar devices are employed in other instances where it is desirable to accurately measure elapsed time intervals. The invention is particularly applicable for testing the accuracy of such timers but its applicability is not to be construed as so limited. The invention may be employed for testing any timing instrument, the operation of which is dependent upon the making and breaking of an electrical circuit.

It is recognized that devices are known and used for calibrating time indicating instruments, such as watches and clocks, which devices include a standard time source with which is compared the operation of the instrument being calibrated. One such device for checking the accuracy of the oscillating balance wheel of a mechanically operated watch or clock employs a light source and a photoelectric cell, the watch mechanism being disposed therebetween in a manner such that the balance wheel intercepts the beam of light from the lamp. The balance wheel is provided with an aperture which allows a beam of light from the lamp to intermittently impinge upon the cell. The electric impulses set up within the cell are amplified and serve to intermittently light a neon lamp. A synchronous motor is run at a controlled frequency and drives a viewing disk which is geared thereto in such a manner that the speed of the viewing disk is proportional to and a multiple of the speed of the synchronous motor. The neon lamp is observed through an aperture provided in the viewing disk adjacent the periphery thereof, which aperture will appear to stand still if the watch is perfectly timed because of the well known stroboscopic effect. If, however, the timing of the balance wheel is either fast or slow the aperture of the viewing disk will appear to rotate.

In another system for testing the accuracy of a mechanically operated watch or other device having periodic motion, a beam of light from a light source is directed on the rim of the balance wheel and reflected thereby to a photocell. Oscillatory action of the balance wheel produces corresponding variations in the output of the photoelectric cell. This output is employed to periodically illuminate a neon light mounted on a rotating disk driven at a constant frequency by any suitable means, such, for example, as a synchronous motor. The neon lamp is observed through a slot in a stationary viewing panel and if the balance wheel is perfectly timed the neon lamp will appear to stand still. If, however, the watch is either slow or fast the neon lamp will appear to move.

Although these devices provide satisfactory means for calibrating mechanically operated timer indicating devices where a high degree of accuracy is not required, they are not adaptable for testing the accuracy of an electric timer, the operation of which is dependent upon the making and breaking of an electrical circuit. Moreover, in these calibrating devices the standard time source is actuated by means of a source of power independent of that which operates the instrument being calibrated. It is obvious that utilization of two independent sources of power renders calibration susceptible to error caused by fluctuations of the source power.

Accordingly, one object of the invention is to provide a system for testing the accuracy of an electric timer operative by the flow of alternating current therethrough.

Another object is to provide such a system including a standard time source which is actuated by a source of power common with that employed to operate the timer.

A further object of the invention is to provide such a system for checking an electric timer with a high degree of accuracy, notwithstanding fluctuations in the source power.

Other objects and features will be apparent from the drawing and description which follow.

The drawing is a schematic view of a system for testing the accuracy of electric timers, which system is constructed in accordance with the present invention.

Referring to the drawing, numeral 1 denotes a synchronous motor to which power is supplied from an alternating current source 2. A plurality of opaque disks 3, 4, and 5, connected to shafts 6, 7, and 8, respectively, are rotatably driven by motor 1, each of the shafts being geared in gear housing 9 to rotor 10 of motor 1. The disks are so positioned as to intercept a beam of light from light source 11 directed toward photoelectric cell 12. Each of the disks 3, 4, and 5 is provided with a suitable aperture 13, 14, and 15, respectively, adjacent the periphery thereof whereby periodic illumination of cell 12 is obtained. By proper selection of the gear ratios the disks may be rotated at speeds such that the peripheral apertures will be coincidental and photoelectric cell 12 will be momentarily illuminated at accurately controlled time intervals. Although the periodicity of illumination is not critical it has been found preferable to rotate the disks at speeds of 1 R. P. M., 60 R. P. M., and 1,800 R. P. M., respectively, whereby momentary illumination of cell 12 will occur once every minute. It is desirable to make the diameters of the disks of such size that cell 12 will not be illuminated during the next succeeding revolution of the disk, rotating at a speed of 1,800 R. P. M., following any illumination.

A transformer, generally denoted by numeral 16, is provided for supplying the various potentials necessary for the operation of the system. Alternating current source 2 is directly connected to primary winding 17. To secondary winding 18 is connected full-wave rectifier 19 by means of which a plate supply voltage is derived. Filament voltage for rectifier 19 is supplied by means of winding 20. For filtering the output of rectifier 19 there is provided a filter network, generally denoted by numeral 21. Resistor 22 and potentiometer 23, comprising a voltage divider, are connected across the output of rectifier 19, as shown. Transformer 16 has two other windings, windings 24 and 25, which provide current for the filament circuit of light source 11 and the heater circuit of thyratron 26. These circuits are not drawn out in full but it will be understood that the filament circuit of light source 11 labeled X—X in the drawing is connected to winding 24, while the heater circuit of thyratron 26 labeled Y—Y is connected to winding 25. The anode (not shown) of cell 12 is connected by wire 27 to a point 28 between resistor 22 and potentiometer 23; and the cathode (not shown) of cell 12 is connected by wire 29 to control grid 30 of thyratron 26. To assure ignition of thyratron 26 by the output of cell 12, as described hereinafter, cathode 31 of thyratron 26 is directly connected to moving arm 32 of potentiometer 23, thereby permitting proper adjustment of the cathode potential. Thyratron 26 is normally maintained in a non-conducting state by applying a negative bias to control grid 30 through the control grid resistor 33 which is connected to the negative side of potentiometer 23, as shown. Connected in the plate 34 circuit of thyratron 26 is a pair of relays 35 and 36, relay 36 being shunted by resistor 37 for reasons pointed out below. Plate supply voltage for thyratron 26 is taken across resistor 22 and potentiometer 23 and applied to plate 34 through conductor 38, switch 39, which is ganged with switch 40, and conductor 41, as shown.

Ganged switches 39 and 40 preferably are of a rotary type having four positions which may be designated as off-position A, start-position B, run-position C, and stop-position D. Switch 39 controls the application of plate voltage to thyratron 26. It is readily seen that plate voltage will be supplied to plate 34 when switch 39 is either in start-position B or in stop-position D. However, when switch 39 is either in off-position A or run-position C, the power supply circuit is open and thyratron 26 is without plate voltage. Switch 40 is employed in controlling alternating current flow through timer 42 which is being tested. Moving arm 43 of switch 40 is connected to one side of alternating current source 2. It is readily seen that with switch 40 in start-position B, when contacts 44 of relay 35 are closed an electrical circuit is completed from alternating current source 2, through switch 40, contacts 44, and timer 42 back to source 2. A similar circuit is completed from alternating current source through timer 42 when contacts 45 of relay 36 are closed and switch 40 is in stop-position D. With switch 40 in run-position C, the timer is connected directly across current source 2. Obviously, when switch 40 is in off-position A, timer 42 will be without power regardless of the fact that contacts 45 may be closed. For reasons pointed out below, rotary switches 39 and 40 are preferably of a type commonly referred to as "shorting-out" switch, whereby when moving from a first to a second position, contact is made with the second position before connection with the first position is broken.

In operation, with switches 39 and 40 in off-position A, timer 42 is connected in the system, as shown. It is obvious that with the switches in this position neither is plate voltage applied to thyratron 26 nor is alternating current flowing through timer 42. Since synchronous motor 1 is directly connected to alternating current source 2, the motor will run at an accurately controlled speed, thereby rotatably driving disks 3, 4, and 5. As pointed out hereinbefore, photoelectric cell 12 will be illuminated momentarily once every minute upon coincidence of apertures 13, 14, and 15 in disks 3, 4, and 5, respectively. Since thyratron 26 is without plate voltage when switch is in off-position A, illumination of cell 12 will have no effect thereon.

After timer 42 has been properly connected in the system, switches 39 and 40 are moved to start-position B, thereby applying plate voltage to thyratron 26. As pointed out above, normally thyratron 26 is in a nonconducting state because of the negative bias applied to control grid 30 through grid resistor 33. However, the internal resistance of photoelectric cell 12 is reduced to a relatively small value when the cell is illuminated, whereby the potential of grid 30 is made more positive and substantially equal that existing at point 28 causing thyratron 26 to ignite. Accordingly, at the instant of the next illumination following the placing of switches 39 and 40 in start-position B, thyratron 26 is caused to ignite. Current flow through the thyratron actuates relays 35 and 36, the contacts of which are normally in the position shown in the drawing, thereby closing contacts 44 and opening contacts 45. Since switch 40 is in start-position B, at the instant of illumination an electrical circuit is completed from alternating current source 2 through switch 40, contacts 44 to timer 42, thereby initiating operation of the latter.

It is a well known characteristic of a thyratron that when it is ignited the grid loses control and the thyratron will continue to conduct current until the plate potential is decreased below the extinction point. Therefore, after timer 42 is put into operation, switches 39 and 40 are moved to run-position C, thereby cutting off the plate voltage and rendering thyratron 26 non-conductive, thus deenergizing relays 35 and 36. It is seen that operation of timer 42 will not be interrupted by this change in position of switches 39 and 40 since switch 40 is of the shorting-out type, and when in run-position C, timer 42 is connected directly across current source 2, as pointed out hereinbefore.

When it is desired to arrest the operation of timer 42, switches 39 and 40 are placed in stop-position D, thereby again applying plate voltage to thyratron 26. Since contact is made with stop-position D before connection with run-position C is broken, timer 42 will continue to run without interruption. However, at the instant of the next illumination thyratron 26 is once again caused to ignite, in a manner described hereinbefore, actuating relays 35 and 36 whereby current flow through timer 42 is interrupted by the opening of contacts 45 and operation thereof arrested.

It is understood that the starting of timer 42 will be delayed after actuation of relay 35 for a time interval equal to that required for contacts 44 to move from their open to their closed position. Accordingly, it is desirable to delay the opening of contacts 45, and, consequently, the stopping of timer 42 at the end of the test, for a time equal this time interval, whereby errors due to the opening and closing of the various relays will be eliminated. This is accomplished by means of resistor 37 connected in parallel with relay 36. By proper selection of the value of this resistor, the opening of contacts 45 may be delayed for a time equal that required for contacts 44 to move from their open position to their closed position.

The present system is adapted to check the accuracy of synchronously driven timers, that is, timers of the type driven by a synchronous motor, the rotor of which revolves an amount directly proportional to the number of cycles of alternating current which pass through the motor as is true of all conventional synchronous motors.

Operation of the present invention will be described in connection with checking a timer which is calibrated to indicate, for example, one minute when the rotor of the timer motor has revolved 1,800 times. Since the timer operates from the same alternating current source 2 as synchronous motor 1, the rotor of the timer motor should revolve at the same speed as the rotor 10 of synchronous motor 1. With shafts 6, 7, and 8 geared so that disks 3, 4, and 5 revolve at speeds of 1 R. P. M., 60 R. P. M., and 1,800 R. P. M., respectively, whereby momentary illumination of cell 12 will occur when the fastest moving disk has revolved exactly 1,800 times, the timer 42 should indicate, if accurate, exactly one minute for each illumination or accurately controlled interval.

Since operation of timer 42 is initiated by the first illumination occurring after switches 39 and 40 are moved to start-position B and is caused to be arrested by a selected subsequent illumination, at the end of the test or check the timer should read or indicate an integral number of minutes. The difference between the theoretical reading and the actual reading is the error in the timer. By way of example, in testing the timer switches 39 and 40 are moved to stop-position D after the timer reads 240 seconds (4 minutes). The next illumination of photocell 12, which will occur after the fastest moving disk has revolved an additional 1,800 times, will cause the current to timer 42 to be interrupted thereby arresting operation thereof. The timer should indicate, if accurate, exactly 300 seconds (5 minutes). If the reading is 299.85 seconds, the timer is in error to the extent of 0.15 second.

Although the frequency of alternating current source 2 may vary slightly from time to time thereby affecting the speed of rotation of the disks, since the accurately controlled interval, 1,800 revolutions of the fastest moving disk, remains constant and the timer is subject to identical changes due to the fact that it is actuated by the same current source, such variation will have no adverse effect upon the test. In other words, the exact time between the illuminations of photocell 12 is of no consequence.

It should be pointed out that although the invention has been described in connection with testing the accuracy of a single electric timer, use of the invention is not so limited but it may be employed for testing simultaneously a plurality of such timers connected in parallel.

I claim:

1. A system for testing the accuracy of a synchronously driven electric timer comprising a source of alternating current, an electrical circuit connecting the current source with the timer, current flow control means in the circuit for controlling flow of the alternating current in the timer, and means for actuating the current flow control means in a manner so that only a desired number of cycles of alternating current flow through the timer, the last mentioned means including a synchronous motor connected with the current source, means operatively associated with the motor for providing a signal upon revolution of the motor rotor a preselected number of times, and a second electrical circuit responsive to the signals for operating the current flow control means.

2. A system for testing the accuracy of a synchronously driven electric timer comprising a source of alternating current, an electrical circuit connecting the current source with the timer, relay means in the circuit for controlling flow of the alternating current in the timer, and means for actuating the relay means in a manner so that only a desired number of cycles of alternating current will flow through the timer, the last mentioned means including a synchronous motor connected with the current source, means operatively associated with the motor for providing a signal upon revolution of the motor rotor a preselected number of times, and a second electrical circuit responsive to the signals for selectively opening and closing the relay means.

3. A system for testing the accuracy of a synchronously driven electric timer comprising a source of alternating current, an electrical circuit connecting the current source with the timer, relay means in the circuit for controlling flow of the alternating current in the timer, and means for actuating the relay means in a manner so that only a desired number of cycles of alternating current will flow through the timer, the last mentioned means including a synchronous motor connected with the current source, means operatively associated with the motor for providing an electrical signal upon revolution of the motor rotor a preselected number of times, and a second electrical circuit responsive to the signals for selectively opening and closing the relay means.

4. A system for testing the accuracy of a synchronously driven electric timer comprising a source of alternating current, an electrical circuit connecting the current source with the timer, relay means in the circuit for controlling flow of the alternating current in the timer, and means for actuating the relay means in a manner so that only a desired member of cycles of alternating current will flow through the timer, the last mentioned means including a synchronous motor connected with the current source, a photocell, a source of light directed at the photocell, light interrupting means interposed between the light source and photocell and operatively associated with the motor, an aperture in the light interrupting means adapted to pass between said light source and photocell on each occasion of revolution of the motor rotor a preselected number of times, thereby to permit light from said source to impinge momentarily upon said photocell, and a second electrical circuit associated with the photocell for selectively opening and closing the relay means when light impinges upon the photocell.

5. A system for testing the accuracy of a synchronously driven electric timer comprising a source of alternating current, an electrical circuit connecting the current source with the timer, relay means in the circuit for controlling flow of the alternating current in the timer, and means for actuating the relay means in a manner so that only a desired number of cycles of alternating current will flow through the timer, the last mentioned means including a synchronous motor connected with the current source, a photocell, a source of light directed at the photocell, a plurality of opaque disks interposed between the light source and the photocell and operatively associated with the motor, each of said disks having an aperture therethrough adapted to be aligned with said photocell and said light source, rotating means comprising said motor for rotating said disks, said rotating means being adapted to bring said apertures into alignment with each other and with said photocell and light source upon the occasion of revolution of the motor rotor a preselected number of times, thereby to permit light from the light source to impinge upon the photocell, and a second electrical circuit associated with the photocell for selectively opening and closing the relay means when light impinges upon the photocell.

6. A system for testing the accuracy of a synchronously driven electric timer comprising a source of alternating current, an electrical circuit connecting the current source with the timer, relay means in the circuit for controlling flow of the alternating current in the timer, and means for actuating the relay means in a manner so that only a desired number of cycles of alternating current will flow through the timer, the last mentioned means including a synchronous motor connected with the current source, a photocell, a source of light directed at the photocell, a plurality of opaque disks interposed between the light source and the photocell and operatively associated with the motor, each of said disks having an aperture therethrough adapted to be aligned with said photocell and said light source, rotating means comprising said motor for rotating said disks, said rotating means being adapted to bring said apertures into alignment with each other and with said photocell and light source upon the occasion of revolution of the motor rotor a preselected number of times, thereby to permit light from the light source to impinge upon the photocell, a thyratron tube circuit connected with the photocell for selectively opening and closing the relay means when light impinges upon the photocell, a source of plate supply voltage for the thyratron, and manually operated switch means for selectively applying plate voltage to the thyratron.

WILLIAM J. KASSIMIR.

REFERENCES CITED

The following references are of record in the file of this patent:

UNITED STATES PATENTS

| Number | Name | Date |
|---|---|---|
| 1,819,494 | Aronoff | Aug. 18, 1931 |
| 1,950,273 | Speakman | Mar. 6, 1934 |
| 2,077,390 | Blau | Apr. 20, 1937 |
| 2,166,833 | Wilfart | July 18, 1939 |
| 2,174,804 | Neville | Oct. 3, 1939 |
| 2,268,133 | Carlson | Dec. 30, 1941 |
| 2,370,727 | Holden | Mar. 6, 1945 |
| 2,409,473 | Callender | Oct. 15, 1946 |